Figure 1:
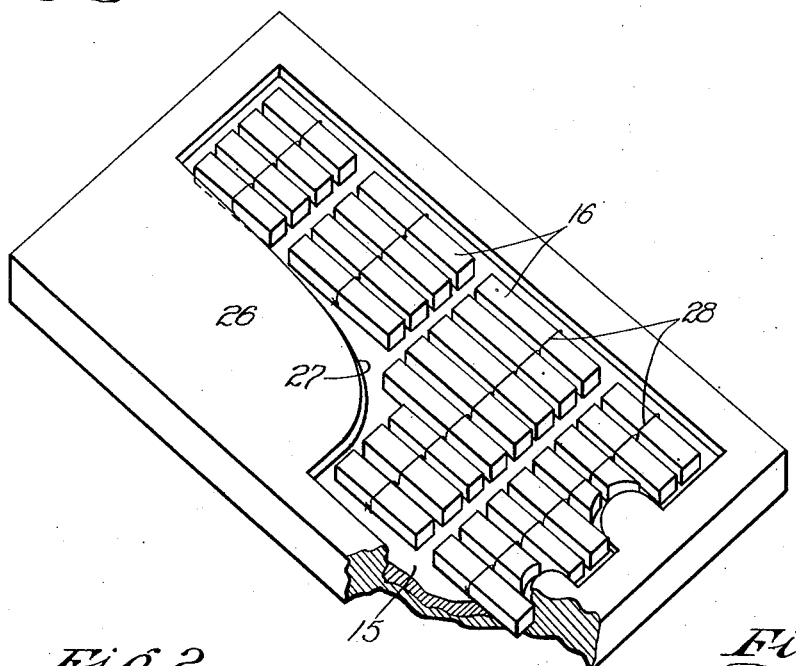

Feb. 27, 1934. J. H. HOWARD ET AL 1,949,050

METHOD FOR MAKING A TOOL

Filed Oct. 5, 1931  2 Sheets-Sheet 1

Inventors
John H. Howard
and
Alfred C. Catland
By
Their Attorney

Feb. 27, 1934.                J. H. HOWARD ET AL                1,949,050
                            METHOD FOR MAKING A TOOL
                              Filed Oct. 5, 1931          2 Sheets-Sheet 2
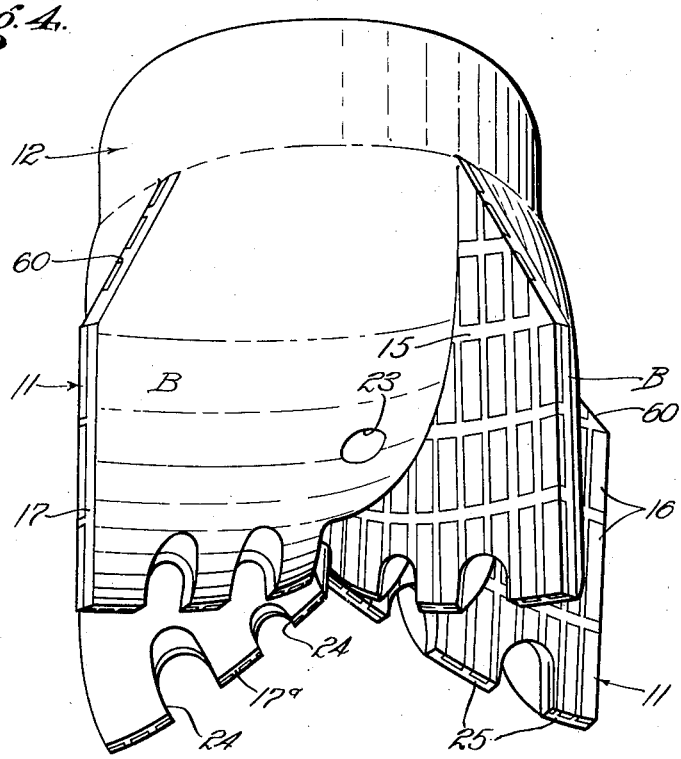
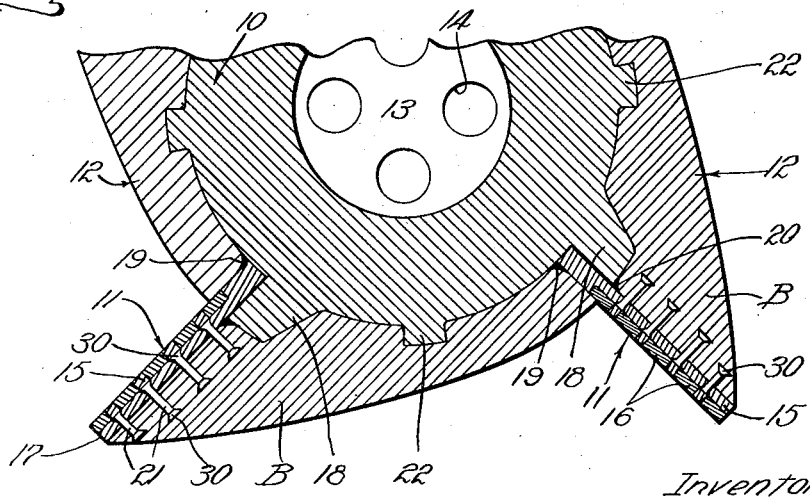
Inventors
John H. Howard
and
Alfred C. Catland
By W. H. Maxwell
Their Attorney Patented Feb. 27, 1934

1,949,050

UNITED STATES PATENT OFFICE 1,949,050

METHOD FOR MAKING A TOOL

John H. Howard, Huntington Park, and Alfred C. Catland, Alhambra, Calif., assignors to Globe Oil Tools Company, Los Nietos, Calif., a corporation of California Application October 5, 1931. Serial No. 566,913

6 Claims. (Cl. 76—108)

This invention relates to a method for making a tool and relates more particularly to a method for making a well drilling tool. It is a general object of the invention to provide a simple, effective and commercially practical method for making a well drilling tool of the general character fully described and claimed in our co-pending applicantion entitled Well bit, Serial Number 566,912, filed October 5, 1931.

An object of the invention is to provide a simple and practical method of embedding a multiplicity of diamond substitutes or bodies of hard cutting material in a plate of a relatively softer material to form a cutting unit for a well tool, or the like.

Another object of the invention is to provide a method for making a cutting unit, of the character referred to, in which the bodies of hard cutting material may be positioned or arranged in any particular relation in the mounting plate; for example, they may be arranged in spaced relation in spaced rows in the finished cutting unit.

Another object of the invention is to provide a method for making a cutting unit of the character mentioned in which the bodies of hard cutting material may be flush with the face of the carrying or mounting plate so as to be in effective active positions on the tool.

Another object of the invention is to provide a method of making a cutting unit of the character mentioned in which the bodies of hard cutting material are embedded in the plate without being subjected to excessively high temperatures.

Another object of the invention is to provide a method for making a cutting unit of the character mentioned that may be carried out with great ease and facility, and without extensive or expensive apparatus.

Another object of the invention is to provide a method for making a well drilling tool which includes the attaching of cutting units to the body or base of the tool, and the casting of relatively soft material on the body of the tool to bond with the body and the cutting unit to provide a backing for the cutting unit.

Another object of the invention is to provide a method of making a well tool wherein the cutting units are directly and effectively connected to the body prior to the casting of the relatively soft material on the body, so that the cutting units are maintained in their proper positions in the mold, and so that they are effectively connected to the body and bonded to the relatively soft material.

A further object of the invention is to provide a method for making a well tool involving a body, relatively soft material on the body, plates connected to the body and bonded with the soft material, and diamond substitutes embedded in the plates, all of said parts forming a single integral whole or tool.

Figure 2:
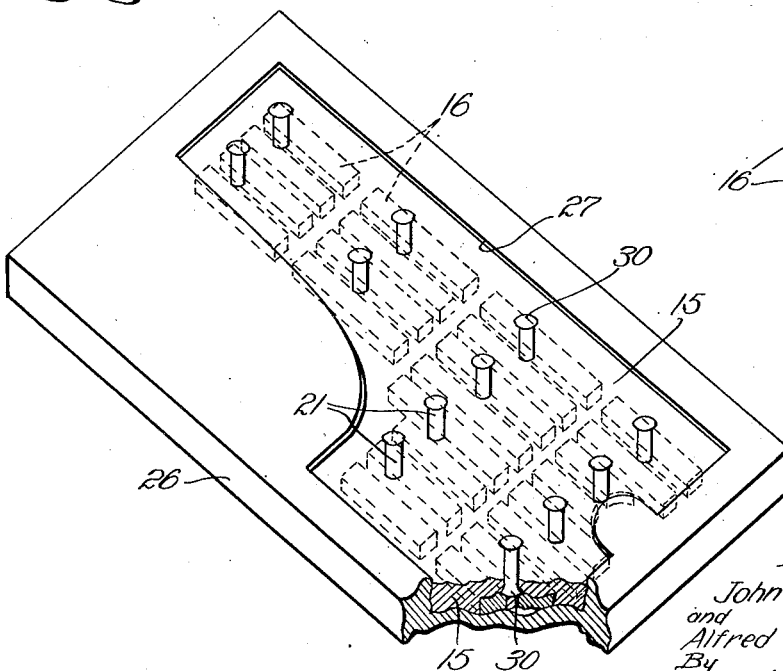
Figure 3:
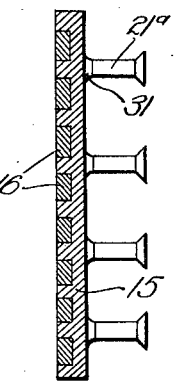

Further objects and features of the invention will be best and more fully understood from the following detailed description of typical applications, and manners of carrying out the invention, throughout which description reference is had to the accompanying drawings, in which:

Fig. 1 is a perspective view of a plate arranged in a mold and a plurality of cutting elements on the plate prior to the embedding of the elements in the plate, being a view showing certain parts broken away to appear in cross-section. Fig. 2 is a view similar to Fig. 1, showing the cutting elements embedded in the plate and illustrating anchor members projecting from the plate. Fig. 3 is a transverse detailed sectional view of a cutting unit showing a modified manner of attaching the bonds or anchoring members to the plate. Fig. 4 is a perspective view of a well drilling bit made in accordance with the present invention. Fig. 5 is a fragmentary horizontal detailed sectional view of the bit illustrated in Fig. 4.

In order to facilitate a clear understanding of the invention, we will proceed with a description of a well drilling bit made in accordance with the method provided by the invention. The particular bit illustrated in the drawings includes generally, a body 10, a plurality of cutting units 11 connected to the body 10, and relatively soft material 12 cast on the body 10 having blades B cast on and backing up the cutting units 11.

The body 10 has a cylindrical upper end portion and a rounded or substantially semi-spherical lower end portion. A central main circulation opening 13 extends into the upper end of the body 10. The circulation opening 13 terminates within the body and a plurality of branch openings 14 are provided in the body to communicate with the lower end of the main opening 13.

The cutting units 11 are the active or cutting elements of the tool. In the particular case illustrated in the drawings, there are four like cutting units 11 provided on the body 10, each unit 11 including a plate 15 of a relatively hard material and a multiplicity of bodies 16 of hard cutting material. It is preferred to form the mounting plate 15 of hard bronze or a like material having a relatively low melting point. The plates 15 may be comparatively thin and may have flat parallel sides. The upper ends 60 of the plates may be inclined downwardly and outwardly, while the lower ends 17a of the plates may be inclined or curved upwardly and inwardly toward the central longitudinal axis of the tool. In the particular case illustrated in the drawings, the several cutting units 11 are circumferentially spaced about the body 10 and are disposed in vertical planes radial to the central longitudinal axis of the tool. It is to be understood that the units 11 may be positioned as desired, for example, they may be inclined so that their lower ends lead their upper ends. The outer edges 17 of the several plates 15 may be straight and substantially vertical. The inner edges of the mounting plates 15 abut or engage the body 10 and are curved to evenly seat against the rounded lower end portion of the body. If found desirable or necessary, the plates 15 may be welded or brazed directly to the body 10, depending on the material of which they are formed. A plurality of vertical abutments or ribs 18 are provided on the body 10. The plates 15 are arranged against the forward faces of the ribs 18 relative to the direction of rotation of the tool when in operation. The inner forward corners of the plates 15 may be welded or brazed directly to the body 10 as at 19, while the rear sides of the plates may be welded or brazed to the outer ends of the ribs 18 as at 20. The brazing or welding 19 and 20 preferably extends the entire lengths of the plates 15. The several cutting units 11 project outwardly and downwardly from the lower end of the body 10 so as to act on the formation at the bottom of the well bore.

The diamond substitutes or bodies 16 of hard cutting material are embedded directly in the mounting plates 15. There is preferably a plurality of hard cutting bodies 16 provided in each plate 15. The bodies 16 may be rectangular and may have their outer sides flush with the forward faces of the plates 15 as illustrated throughout the drawings. The several bodies 16 of hard cutting material are preferably arranged in spaced relation in the plates 15 and in accordance with the broader principles of the invention, may be arranged in various positions or locations in the plates. In the particular case illustrated in the drawings, the diamond substitutes or bodies 16 of hard cutting material are arranged in spaced relation in spaced vertical and substantially horizontal rows. The cutting elements or cutting bodies 16 may be formed of tungsten carbide or other abrasion resisting material.

Bonding or anchoring means may be provided in connection with each of the cutting units 11 to insure a more perfect connection between the cutting units and the blades B. In Figs. 2, 3, and 5 of the drawings, bonds or anchoring studs 21 project from the rear sides of the plates 15 to be embedded in the material of the blades B. The anchoring members or studs 21 have their inner ends cast or embedded in the plates 15, and are provided at their opposite ends with enlargements or heads. It will be apparent how the studs 21 permanently anchor or connect the cutting units 11 with the blades B.

The relatively soft material 12 is cast directly on the body 10 and completely encases the exterior of the body. The material 12 may be in the nature of bronze, brass, aluminum or like metal having a relatively low resistance to abrasion. Spaced vertical tongues 22 may be provided on the body 10 to anchor the soft material 12 to the body. Discharge openings 23 are provided in the material 12 to register with the branch openings 14. The blades B are integral with the main body of soft material 12 and are cast directly on the backs or rear sides of the plates 15. The blades B may have the same edge configuration as the plates 15 and the rear sides of the blades B may be bevelled inwardly and rearwardly from the vertical edges 17 of the blades and the lower ends 17a of the blades. Spaced notches 24 may be provided in the lower edge of each plate 15 and its backing blade B, to form spaced teeth 25 on the cutting units.

The method provided by the present invention includes generally, the embedding of a plurality of bodies 16 of hard cutting material in a plate 15 to form a cutting unit 11, the joining or attaching of a plurality of such cutting units 11 to the body 10 of the tool, and the casting of the relatively soft material 12 on the body 10.

The step of embedding the bodies 16 in the plate 15 includes the placing of the plate 15 in a form or mold 26 and the heating of the plate 15 to a molten or liquid condition. The mold or form 26 may be formed of steel, or the like, and the mold or matrix cavity 27 is preferably of the same configuration as the plate 15. The bottom or the lower wall of the form of cavity 27 is flat, while the side or edge walls of the cavity may be vertical or slightly inclined to facilitate the easy removal of the cutting unit. The plate 15 may be subjected to the necessary heat to bring it to the melting point or approximately to the melting point in any suitable manner. It is preferred to form the plate 15 of hard bronze or a like metal in preference to steel or other ferrous metals, as bronze, or the like, makes a more perfect bond with the hard cutting bodies 16 and has a relatively low melting point so that the bodies 26 are not subjected to excessively high temperatures during their casting in the plate. Prior to or after the mounting plate 15 has become molten or semi-liquid the diamond substitutes 16 are placed upon its upper side. In most instances it may be desirable to place the bodies 16 on the upper side of the plate 15 before the plate is heated and to allow the bodies to remain on the plate when it is brought to a molten condition so that the bodies may slowly sink into the plate. The diamond substitutes or bodies 16 are allowed to pass or sink to the bottom of the molten plate 15 and come to rest on the bottom or lower wall of the matrix cavity 27. If desired or found necessary, the several bodies 16 of hard cutting material may be forcibly pressed through the softened plate 15 to the desired positions.

It is usually preferred to arrange the several bodies 16 of hard cutting material in spaced relation and in definite positions with respect to the plate 15 during their embedding in the plate. If the diamond substitutes are formed of tungsten carbide, or the like, having a high specific gravity, it may only be necessary to arrange them in the desired positions on the upper side of the plate and allow them to sink into the plate without the provision of means for spacing them or holding them in definite relative positions. However, if found necessary, the multiplicity of bodies 16 may be spaced apart and held in definite positions with respect to one another in any suitable or desired manner. In the particular case illustrated in the drawings, the bodies 16 of each of the transverse or horizontal rows are tied together by a wire or wires 28, wrapped about and connecting each of the several bodies. It is to be understood that the several diamond substitutes or hard cutting bodies 16 may be tied together by the wires 28 before being placed on the plate 15. It will be apparent how the wires 28 retain the several bodies 16 in alignment and in spaced relation during their sinking through the plate and during the cooling or setting of the plate. Where the bodies 16 are permitted to sink completely through the plate to come to rest on the bottom wall of the matrix cavity 27, the outer surfaces of the bodies 16 are flush with the face of the plate 15, the bottom wall of the matrix cavity acting to support the several bodies 16 in horizontal parallelism and flush with the face of the plate. In some instances it may be desirable to completely embed the bodies of hard cutting material in the mounting plate 15, in which case the bodies may be held in any desired position in the plate until the plate has cooled and hardened.

The bonding or anchoring studs 21 may be secured or cast in the plate 15 when the plate is in a molten condition. In the embodiment of the invention illustrated in Figs. 2 and 5 of the drawings, a plurality of studs 21 have their inner end portions cast or embedded in the mounting plate 15. The inner end portions of the studs 21 may be pushed or thrust into the plates while the plate is in a molten or liquid condition and are accordingly permanently fixed in the plate when the plate cools or solidifies. Enlargements or heads 30 may be provided on both the inner and outer ends of the mounting studs 21. Fig. 3 of the drawings illustrate a modified manner of attaching the mounting studs 21a to the plate 15. The ends of the studs 21a are welded or brazed to the rear sides of the plate 15 as at 31. The studs 21 are welded or brazed to the plate 15 after the bodies 16 of hard cutting material have been embedded in the plate and after the plate has cooled and become solidified.

After the bodies 16 of hard cutting material have been embedded in the mounting plate 15, in the manner described above, the plate 15 is removed from the form or mold 26 so that the cutting unit is ready for attachment to the body 10 of the tool. As set forth above, the plates 15 of the several cutting units 11 may be welded or brazed directly to the body 10. The rear sides of the several plates 15 are held against the forward faces of the abutment ribs 18 during the welding or brazing of the plates to the body.

The relatively soft material 12 is cast directly on the body 10 and the rear sides of the several cutting units 11. The body 10 together with the units 11 may be arranged in a suitably shaped mold or form (not shown) and the molten bronze, brass, aluminum or the like, forming the material 12, may be cast directly on the body 10 and the rear sides of the plates 15. If found desirable or necessary, the body 10 and the plates 15 may be plated or otherwise treated to insure a more perfect bonding with the relatively soft material 12. It will be apparent that the relatively soft material 12 bonds or unites directly with the body 10 and the rear sides of the plates 15 and embeds or encases the anchoring studs 21 and the tongues 22. After the material 12 has cooled and hardened, the tool is ready for use.

The method provided by the present invention provides a particularly effective well drill tool in which the body, the cutting units 11 and the relatively soft backing material 12 are all united in a single integral member or tool. The cutting units 11 produced in accordance with the method, are of particular utility as the cutting bodies 16 are embedded in definite relation to one another in the face of the plate 15 to be active in engaging the formation, and are embedded in the plate 15 so as to be dependably fixed in position. The plates 15 may be formed of a material sufficiently rigid and strong to properly and securely carry the bodies of hard cutting material. The blades B back up the cutting units 11 and being formed of a material having a relatively low resistance to abrasion, wear away together with the cutting units so as to not interfere with the cutting action of the units. The relatively soft material 12 in being cast directly on the body 10 and the rear sides of the mounting plates 15, is fixedly secured on the tool and further unites the cutting units 11 with the body 10. The method provided by the present invention may be carried out with simple and inexpensive apparatus.

Having described only a typical preferred manner of carrying out our invention, we do not wish to limit ourselves to the specific details set forth, but wish to reserve to ourselves any changes or variations that may appear to those skilled in the art or fall within the scope of the following claims.

Having described our invention, we claim:

1. The method of making a tool including, placing a body of hard cutting material on a plate, heating the plate to a substantially molten condition to cause the body of hard cutting material to sink therein, cooling the plate, attaching the plate to the body of the tool, and then casting material on the body and a side of the plate.

2. The method of making a tool including, providing a base having a projecting part, placing a body of hard cutting material on a member formed of a material having a relatively low melting point, heating the member to a liquid or semi-liquid state to cause the body of hard cutting material then to sink therein, cooling the member, attaching the member to the base so as to have a portion of a side bearing against said part, and then casting material on the base and the remainder of the said side of the member.

3. The method of making a tool including, placing a body of hard cutting material on a member formed of a material having a relatively low melting point, heating the member to a liquid or semi-liquid state to cause the body of cutting material to sink therein, cooling the member, attaching the member to the body of the tool and then casting relatively soft material on the said body and the member.

4. The method of making a tool including, placing a plate of material having a relatively low melting point in a form, placing a plurality of bodies of hard cutting material on the plate, heating the plate to a liquid condition to cause the bodies to sink therein, cooling the plate, removing the plate from the form attaching the plate directly to the body of the tool, and casting metal on the body and a side of the plate.

5. The method of making a tool including, placing a plate of material having a relatively low melting point in a form, placing a plurality of bodies of hard cutting material on the plate, heating the plate to a substantially liquid state to cause the said bodies to sink therein, thrusting an anchor stud in the plate to project from a side of the plate, cooling the plate, removing the plate from the form, attaching the plate to the body of the tool and casting metal on the body and the said side of the plate to embed said stud.

6. The method of making a tool including, providing a plurality of bodies of hard cutting material, connecting said bodies to maintain them in spaced relation, placing the bodies thus connected on a plate, heating the plate to a liquid or substantially liquid state to cause the bodies to sink therein, cooling the plate, attaching the plate to the body of the tool, and then casting material on the body of the tool and a side of the plate.

JOHN H. HOWARD.
ALFRED C. CATLAND.